(12) United States Patent
Grisenthwaite (10) Patent No.: US 8,799,621 B2
(45) Date of Patent: *Aug. 5, 2014

(54) TRANSLATION TABLE CONTROL

(71) Applicant: ARM Limited, Cambridge (GB)

(72) Inventor: Richard Roy Grisenthwaite, Guilden Morden (GB)

(73) Assignee: ARM Limited, Cambridge (GB)

( * ) Notice: Subject to any disclaimer, the term of this patent is extended or adjusted under 35 U.S.C. 154(b) by 0 days.

This patent is subject to a terminal disclaimer.

(21) Appl. No.: 13/962,139

(22) Filed: Aug. 8, 2013

(65) Prior Publication Data

US 2014/0040529 A1     Feb. 6, 2014

Related U.S. Application Data

(63) Continuation of application No. 13/064,243, filed on Mar. 14, 2011, now Pat. No. 8,566,563.

(30) Foreign Application Priority Data

Mar. 15, 2010   (GB) ................................... 1004294.3

(51) Int. Cl.
*G06F 12/00* (2006.01)
*G06F 13/00* (2006.01)

(52) U.S. Cl.
USPC ............ 711/206; 711/100; 711/154; 711/200

(58) Field of Classification Search
CPC ...... G06F 12/00; G06F 12/10; G06F 12/1009
USPC .......................... 711/100, 118, 154, 200, 206
See application file for complete search history.

(56) References Cited

U.S. PATENT DOCUMENTS

| 4,763,250 | A | 8/1988 | Keshlear et al. |
| 5,963,984 | A | 10/1999 | Garibay, Jr. et al. |
| 6,418,521 | B1 * | 7/2002 | Mathews et al. ............... 711/207 |
| 6,606,697 | B1 | 8/2003 | Kawahara et al. |

(Continued)

FOREIGN PATENT DOCUMENTS

| JP | 5-20199 | 1/1993 |
| JP | 2001-51900 | 2/2001 |

(Continued)

OTHER PUBLICATIONS

Search Report for GB 1004294.3 dated Jul. 1, 2010.
International Search Report and Written Opinion of the International Searching Authority mailed May 10, 2011 in PCT/GB2011/050210.
Japanese Office Action mailed Feb. 10, 2014 in JP 2012-557602 and English translation.

*Primary Examiner* — Tuan Thai
(74) *Attorney, Agent, or Firm* — Nixon & Vanderhye P.C.

(57) ABSTRACT

Memory address translation circuitry 14 performs a top down page table walk operation to translate a virtual memory address VA to a physical memory address PA using translation data stored in a hierarchy of translation tables 28, 32, 36, 38, 40, 42. A page size variable S is used to control the memory address translation circuitry 14 to operate with different sizes S of pages of physical memory addresses, pages of virtual memory address and translation tables. These different sizes may be all 4 kBs or all 64 kBs. The system may support multiple virtual machine execution environments. These virtual machine execution environments can independently set their own page size variable as can the page size of an associated hypervisor 62.

11 Claims, 5 Drawing Sheets

(56) References Cited

U.S. PATENT DOCUMENTS

| | | | |
|---|---|---|---|
| 6,738,888 B2 * | 5/2004 | Chauvel | 711/207 |
| 7,925,859 B2 * | 4/2011 | Banerjee et al. | 711/205 |
| 2005/0015378 A1 * | 1/2005 | Gammel et al. | 707/100 |
| 2007/0106875 A1 * | 5/2007 | Mather | 711/206 |
| 2009/0024824 A1 | 1/2009 | Stecher | |

FOREIGN PATENT DOCUMENTS

| | | |
|---|---|---|
| JP | 2002-539555 | 11/2002 |
| JP | 2009-523269 | 6/2009 |
| WO | WO 03/007156 | 1/2003 |
| WO | WO 2007/097123 | 8/2007 |

* cited by examiner

TRANSLATION TABLE CONTROL

This application is a Continuation of U.S. patent application Ser. No. 13/064,243, filed Mar. 14, 2011, which claims priority to GB Application No. 1004294.3 filed 15 Mar. 2010, the entire contents of which are hereby incorporated by reference in this application.

BACKGROUND OF THE INVENTION

1. Field of the Invention

This invention relates to the field of data processing systems. More particularly, this invention relates to memory address translation mechanisms for translating a virtual memory address to a physical memory address within data processing systems.

2. Description of the Prior Art

It is known to provide data processing systems with memory address translation circuitry, such as memory management units, which serve to translate a virtual address generated by a processor into a physical address for accessing a memory system. One way of performing the required translation is to use translation tables. These translation tables may be arranged as a hierarchy of translation tables with each level of the hierarchy taking one portion of the virtual address to index into a table to find either a pointer to a further level of table, or a descriptor which provides the target physical address. A top down page table walk operation is performed in which a sequence of indexed lookups into the different levels of the page tables are performed until the full virtual address has been translated into the target physical address. The significance of "top-down" is that the first level of table takes the most significant portion of the virtual address to index the table.

In many systems it is common that the address space is divided into 4 kB pages and address translation is performed with the granularity of this page size. Furthermore, the page tables (translation tables) are also arranged to have a size of 4 kB so that they efficiently fit within pages of memory allocated to store those page tables.

Considerable amounts of software exists which either explicitly or implicitly rely upon the memory address space being divided into 4 kB pages. Such software may not operate correctly if the page size is varied.

SUMMARY OF THE INVENTION

Viewed from one aspect the present invention provides an apparatus for processing data comprising:

memory address translation circuitry configured to perform a top down page table walk operation to translate a virtual memory address to a physical memory address using translation data stored in a hierarchy of translation tables; wherein said translation data specifies translations between pages of $2^N$ contiguous bytes of virtual memory addresses and corresponding pages of $2^N$ contiguous bytes of physical memory addresses, where N is a positive integer;

said hierarchy of translation tables comprises translations tables of $2^N$ contiguous bytes in size such that a complete translation table is stored within one page of said physical memory; and said memory address translation circuitry is responsive to a page size variable specifying a current value of N to control said memory address translation circuitry to operate with a selected size of pages of physical memory addresses, pages of virtual memory addresses and translation tables.

The present techniques recognise that with the significant increase in the sizes of memory space now being provided (e.g. larger memory capacity and a change from 32-bit addresses to 64-bit addresses) utilising 4 kB memory pages provides a level of granularity of control over the memory which is not often in practice required. Furthermore, the present techniques recognise that in order to use 4 kB pages with larger physical addresses, there is a requirement for more levels of page tables within a page table hierarchy supporting a top down page table walk operation. For example, if each level of page table is able to translate nine bits of virtual address to nine bits of physical address, then translating a 64-bit virtual address to a 64-bit physical address may take as many as six levels of page table walk. This introduces an undesirably increased delay. The present techniques both recognise and address these problems by providing that the sizes of the pages of the physical memory and the virtual memory together with the translation table (page table) size can be switched between different values with the memory address translation circuitry adapting to perform the required top down page table walk operation with the currently selected size of the memory pages and translation tables. The translation tables can still fit efficiently within the memory pages and the larger translation tables allow an increase in the number of bits of the virtual address which can be translated to bits of the physical address with each level of page table. This reduces the number of levels of page table which need to be accessed in a translation so reducing the associated delays.

The present techniques may be used within systems having a processor executing program instructions providing a plurality of virtual machine execution environments. These virtual machine execution environments may have their page size variables independently set such that different virtual machine execution environments operating on the same hardware and utilising the same memory address translation circuitry can have different page sizes.

When using a system providing a virtual machine execution environment, the virtual machine has its own translation data stored in a hierarchy of virtual machine translation tables and each access to a virtual machine translation table by the memory address translation circuitry requires a further address translation by the memory address translation circuitry to identify the underlying physical address. Thus, if a page table walk through the virtual machine translation tables is a four level walk, then each level of walk through the virtual machine translation table hierarchy will itself require multiple page table walks to be performed to identify the physical address (e.g. four further levels of page table walk to identify the physical address of the next virtual machine translation table) thereby rapidly increasing the total number of levels of page table translation required whenever a top down page table walk is initiated. Thus, the present techniques which permit the use of larger page tables and so reduce the number of levels of page table walk which need to be performed even for large memory address spaces have a significant advantage when applied to systems providing virtual machine execution environments.

The page size variable used for the further address translation associated with each access to a virtual machine translation table may use a page size variable which is set independently of the page size variables of the plurality of virtual machine execution environments.

In some embodiments of the invention hint data may be associated with the smaller page size to indicate that a plurality of these small pages that are located contiguously next to each other within the virtual memory are also located contiguously next to each other within the physical memory and so all could be represented by a single virtual-to-physical address translation of a larger sized page. This contiguousness hint data is useful in allowing mechanisms which cache virtual-to-physical address translations to recognise when such contiguous pages arise and mark the translations concerned as having an effective larger page size thereby saving space within the storage capacity of those translation caching mechanisms (e.g. translation lookaside buffers). In such embodiments, it is particularly desirable if the effective larger page size corresponds to a larger different sized page that can be selected by the page size variable.

It will be appreciated that if not all of a memory address space is desired to be available for use, then it is possible to reduce the number of levels of page table walk required by arranging for a portion of the virtual address extending from a most significant bit end of the virtual address to be required to be a fixed value, typically all zeros or all ones, so avoiding the need to perform the highest levels of the translation table walk. Thus, if the memory addresses provide 64-bits of memory address space, then it may be that in a practical embodiment only 48 bits of this address space are required and accordingly the upper 16 bits of virtual address space are required to be all 0 or all 1, or else a memory transform fault will occur.

Sizes of page table it has been found that are practical and desirable to provide include those of 4 kB and 64 kB, i.e corresponding to $2^{12}$ and $2^{16}$.

Viewed from another aspect the present invention provides an apparatus for processing data comprising:

memory address translation means for performing a top down page table walk operation to translate a virtual memory address to a physical memory address using translation data stored in a hierarchy of translation tables; wherein said translation data specifies translations between pages of $2^N$ contiguous bytes of virtual memory addresses and corresponding pages of $2^N$ contiguous bytes of physical memory addresses, where N is a positive integer;

said hierarchy of translation tables comprises translation tables of $2^N$ contiguous bytes in size such that a complete translation table is stored within one page of said physical memory; and said memory address translation means is responsive to a page size variable specifying a current value of N to control said memory address translation circuitry to operate with a selected size of pages of physical memory addresses, pages of virtual memory addresses and translation tables.

Viewed from a further aspect the present invention provides a method of processing data comprising the steps of:

performing a top down page table walk operation to translate a virtual memory address to a physical memory address using translation data stored in a hierarchy of translation tables; wherein said translation data specifies translations between pages of $2^N$ contiguous bytes of virtual memory addresses and corresponding pages of $2^N$ contiguous bytes of physical memory addresses, where N is a positive integer;

said hierarchy of translation tables comprises translation tables of $2^N$ contiguous bytes in size such that a complete translation table is stored within one page of said physical memory; and operating with a selected size of pages of physical memory addresses, pages of virtual memory addresses and translation tables in response to a page size variable specifying a current value of N.

The above, and other objects, features and advantages of this invention will be apparent from the following detailed description of illustrative embodiments which is to be read in connection with the accompanying drawings.

DESCRIPTION OF THE EMBODIMENTS

Figure 1:
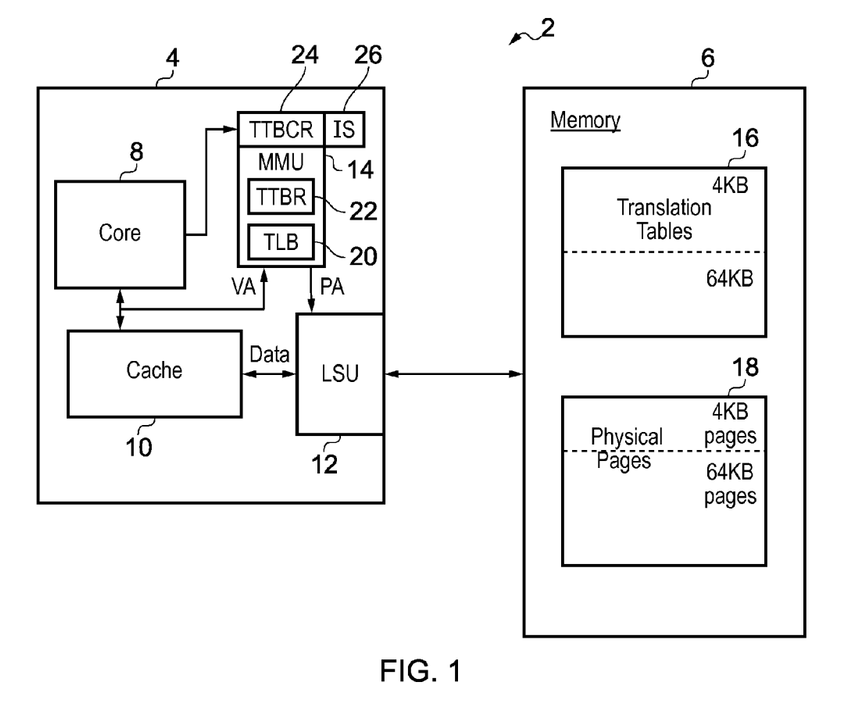
FIG. 1 schematically illustrates a data processing system including a processor coupled to a memory with the processor including memory address translation circuitry.

FIG. 1 schematically illustrates a data processing system 2 comprising a processor 4 coupled to a memory 6. The processor 4 includes a data processing core 8, a cache memory 10, a load store unit 12 and a memory management unit 14 (memory address translation circuitry). The memory 6 stores translation tables 16 (also known as page tables) and physically addressed pages of data 18.

When executing program instructions, the data processing core 8 generates virtual addresses VA which are translated to physical addresses PA by the memory management unit 14. The memory management unit 14 may also have other functions, such as controlling access to a particular page(s) of memory depending upon a level of privilege or other attributes associated with the current processing or with the page of memory. The memory management unit 14 includes a translation lookaside buffer 20 which stores a cache of translation data for translating recently used virtual addresses to physical addresses. When a virtual address requires translation and the required translation information is not stored within the translation lookaside buffer 20, then the memory management unit 14 triggers a top down page table walk operation. A starting point for this page table walk operation is the memory address of the entry point into the translation tables. This entry point is stored in the translation table base register 22 within the memory management unit 14.

The memory management unit 14 also includes a translation table base control register 24 which is writeable by the processing core 8 and includes a page size field 26 storing a page size variable S. This page size variable S controls the size of the pages of physical memory, pages of virtual memory and translation tables when the memory management unit 14 is performing a top down page table walk operation. The translation table base control register 24 may also be used to switch values stored within the translation table base register 22 thereby switching different hierarchies of translation tables into and out of use. Each of these different hierarchies of page tables may have its own associated page size variable. Thus, for example, a system supporting multiple virtual execution environments may have one set of translation tables specifying a 4 kB page size and translation table size and another set of translation tables with a 64 kB page size and translation table size.

Figure 2:
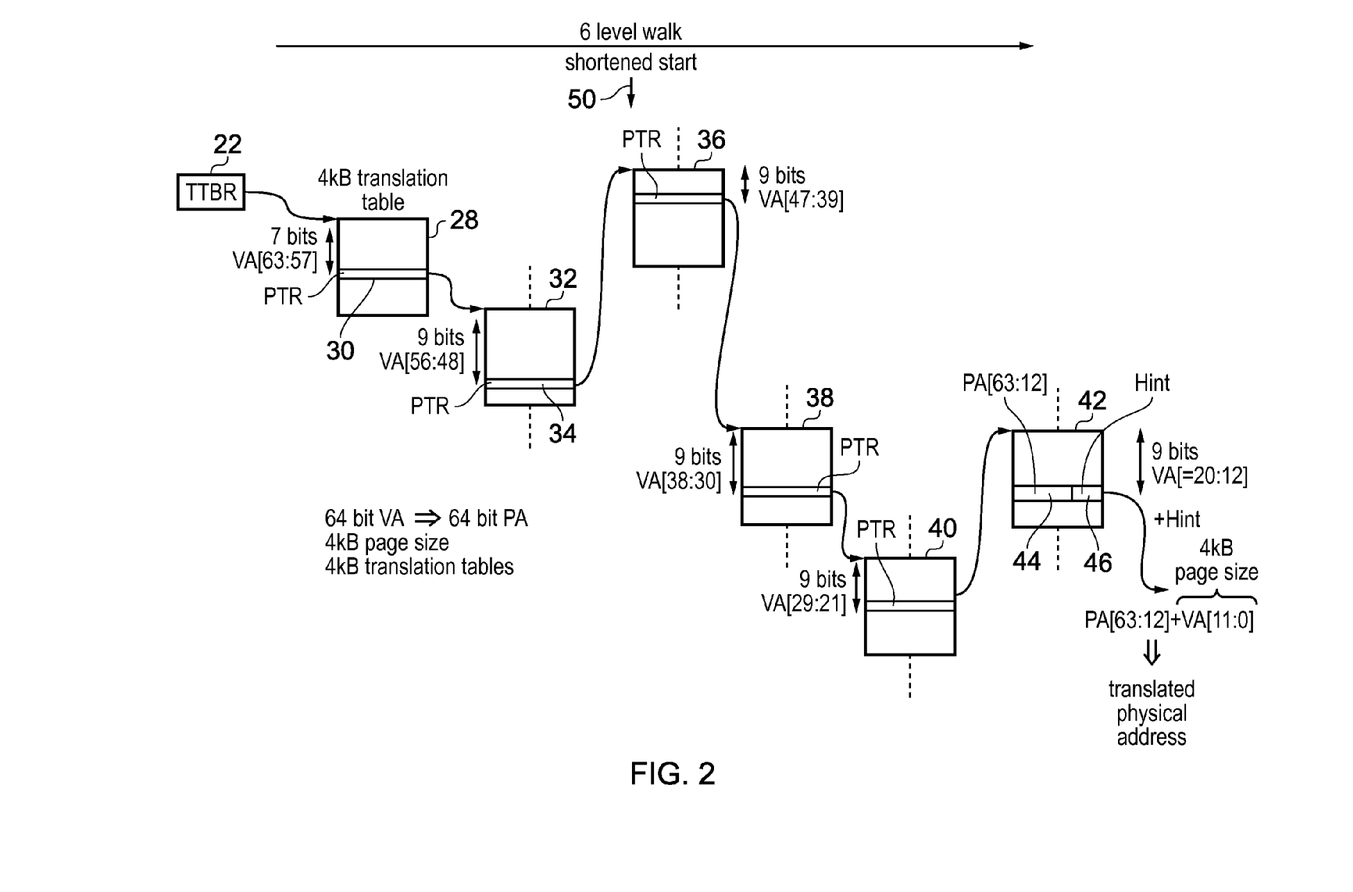
FIG. 2 schematically illustrates a top down page table walk operation utilising 4 kB translation tables and 64-bit addresses.

FIG. 2 schematically illustrates a six level top down page table walk performed by the memory management unit 14 upon a miss in the translation lookaside buffer 20 when the page size variable specifies that the page size and the translation table size is 4 kB. The translation table base register 22 stores an address pointing to the start location of the highest level translation table 28. The most significant seven bits of the virtual address are used to provide an index into this translation table and identify a pointer 30 to the start address of the second level translation table 32. The next nine bits of the virtual address are then used to index into this second level table 32 to identify a pointer 34 to the start of the third level table 36. This process continues taking successive nine bit portions of the virtual address to index into a fourth level translation table 38, a fifth level translation table 40 and a sixth level translation table 42. When the final indexing operation is made into the sixth level table 42, the entry identified 44 stores the most significant 52 bits of the physical address corresponding to the virtual address to be translated with the least significant 12 bits of the virtual address being used to form the least significant 12 bits of the physical address which will be generated. Since the least significant 12 bits of the virtual address are not translated this corresponds to the granularity of the translation performed and accordingly the page size of the virtual memory and the physical memory between which translations are made. In this case the page size of the pages of physical memory and the page size of the pages of virtual memory are 4 kB. It is possible that the highest order page table may be smaller in size to provide mappings matching the overall size of the total memory address space.

The translation data recovered from the top down page table walk operation illustrated in FIG. 2 is cached within the translation lookaside buffer 20 such that if another memory access is made to that same virtual address page while the translation data persists within the translation lookaside buffer 20, then another page table walk need not be performed.

Also present within the entry 44 of the sixth level table 42 is contiguousness hint data 46. This hint data indicates whether the pages of physical memory corresponding to contiguous pages of virtual memory are also located contiguously within the physical memory in blocks of 64 kB. If this is the case, then the data cached back in the translation lookaside buffer 20 corresponding to this translation which has been performed can be marked to indicate that the translation data concerned applies to 16 contiguous virtual pages. This saves storage space within the translation lookaside buffer 20.

Figure 3:
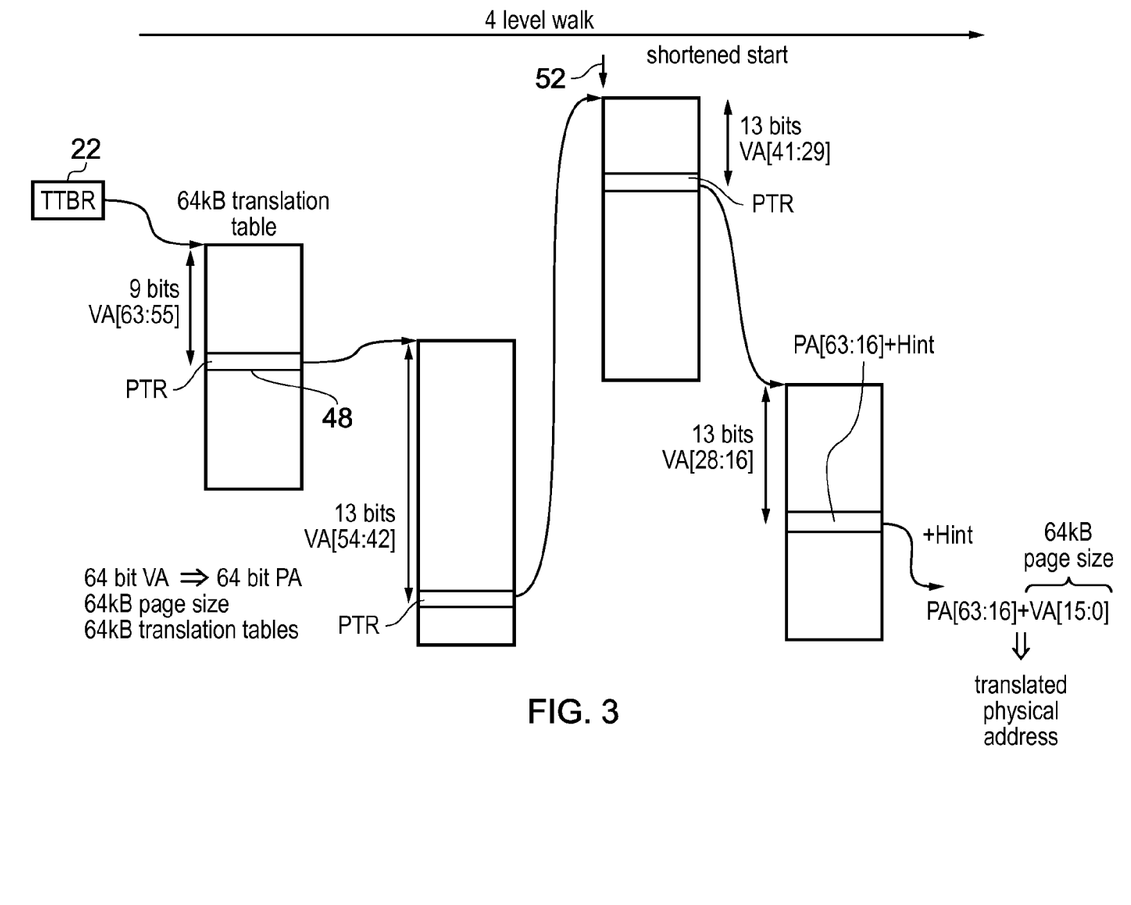
FIG. 3 schematically illustrates a top down page table walk operation utilising 64 kB translation tables and 64-bit memory addresses.

FIG. 3 schematically illustrates a four level page table top down walk operation performed when the page size variable S specifies that the pages of physical memory addresses, pages of virtual memory addresses and the translation tables all have a size of 64 kB. The top down page table walk operation of FIG. 3 is similar in principle to that illustrated in FIG. 2 and discussed above, except that in this case the translation tables have a size of 64 kB. This larger size of page table enables a larger number of pointers 48 to be stored within each translation table and accordingly more bits of virtual address to be translated with each translation table access. Thus, the second, third and fourth level page table access operations can each consume 13 bits of virtual address and accordingly the number of levels of page table walk required can be reduced to four levels in order to perform a full 64-bit virtual to physical memory address translation. It will be further noted that the increase in size of the pages of physical memory addresses and the pages of virtual memory addresses has the result that the least significant 16 bits of the virtual address are not translated as this is the memory page size granularity. This larger granularity decreases the number of virtual address bits which need to be translated to physical address bits and this helps to reduce the number of levels of page table walk required.

Also illustrated in FIG. 2 and FIG. 3 are shortened start points 50 and 52. The translation table base control register 24 for a particular set of translation tables may indicate that a portion of the virtual address starting from a most significant bit end of the virtual address must be all 0s or all 1s, or else a memory fault will occur. In this case, the upper levels of the top down page table walk operation need not be performed since those most significant bits of the virtual address will be subject to checking that they are a fixed value (such as all zeros or all ones) by the memory management unit 14. This reduces the number of levels of page table walk in a manner which reduces the latency associated with such page table walking operations for situations where the full virtual address space of the 64 bits is not required.

Figure 4:
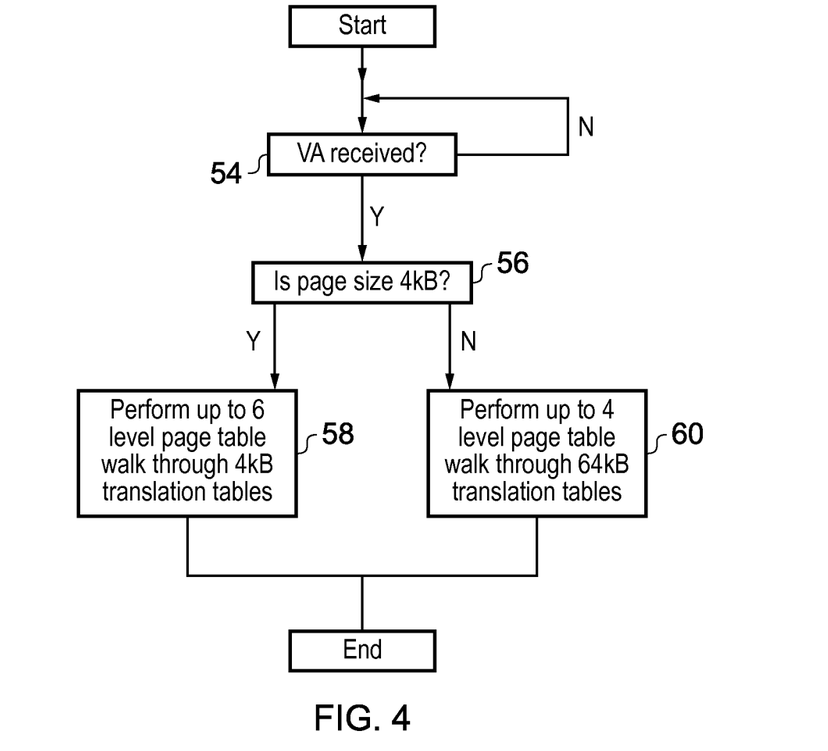
FIG. 4 is a flow diagram schematically illustrating operation of the memory address translation circuitry upon receiving a virtual address to translate.

FIG. 4 is a flow diagram schematically illustrating one view of the operation of the memory management unit 14. At step 54 the memory management unit waits for a virtual address to be received for translation. When such a virtual address has been received, step 56 determines whether or not the currently active hierarchy of translation tables pointed to by the translation table base register 22 under control of the translation table base control register 24 is one which has a 4 kB size. This may be read from the page size variable S. The page size so determined serves to configure the memory management unit 14 to perform either an up to six level page table walk through 4 kB translation tables at step 58 or an up to four level page table walk through 64 kB translation tables at step 60. Once the required page table has been subject to a top down page table walk in accordance with its translation table size and memory page size, then the physical address will have been generated.

It will be appreciated that the flow diagram of FIG. 4 is simplified and that in practice other operations such as determining whether the required translation information is already stored within the translation lookaside buffer 20 may be performed as well as other operations, such as determining whether or not the access request to the virtual address has the appropriate level of permissions.

Figure 5:
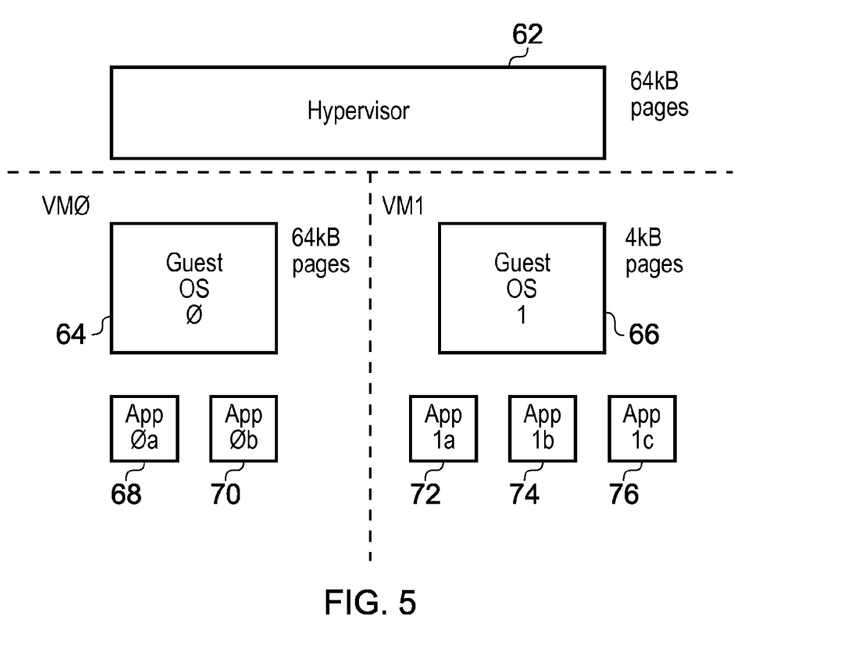
FIG. 5 schematically illustrates the provision of multiple virtual machine execution environments with different page sizes

FIG. 5 schematically illustrates a system operating multiple virtual machine execution environments. Within such a system a hypervisor 62 is responsible for providing a virtual machine execution environment to a first guest operating system 64 and a second guest operating system 66. Each of these guest operating systems then manages and cooperates with its respective application programs 68, 70, 72, 74, 76. The hypervisor 62 may operate with one set of translation tables and its own page size variable. The different virtual machines may have their own page size variable which is independently set of any other virtual machine and of the hypervisor 62. Thus, the second guest operating system 66 in FIG. 5 may be a legacy guest operating system required to support 4 kB page sizes as this page size is assumed by its application programs 72, 74, 76. Conversely, the first guest operating system 64 and the hypervisor 62 may operate with a page size variable corresponding to a memory page size and a translation table size of 64 kB. This is a page size and a translation table size more suited for larger address spaces, such as those that may be addressable by 64-bit addresses.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. Apparatus for processing data comprising:
   memory address translation circuitry configured to perform a top down page table walk operation to translate a virtual memory address to a physical memory address using translation data stored in a hierarchy of translation tables; wherein
   said translation data specifies translations between pages of $2^N$ contiguous bytes of virtual memory addresses and corresponding pages of $2^N$ contiguous bytes of physical memory addresses, where N is a positive integer;
   said hierarchy of translation tables comprises translation tables of $2^N$ contiguous bytes in size such that a complete translation table is stored within one page of said physical memory; and
   said memory address translation circuitry is responsive to a page size variable specifying a current value of N to control said memory address translation circuitry to operate with a selected size of pages of physical memory addresses, pages of virtual memory addresses and translation tables, wherein a predetermined portion of said virtual address extending from a most significant bit end of said virtual address is given a fixed translation to a corresponding portion of said physical address without requiring a page table walk.

2. Apparatus as claimed in claim 1, comprising a processor configured to execute program instructions providing a plurality of virtual machine execution environments, said page size variable for each of said plurality of virtual machine execution environments being configured to be independently set.

3. Apparatus as claimed in claim 2, wherein each of said virtual machine execution environments has virtual machine translation data stored in a hierarchy of virtual machine translation tables and each access to a virtual machine translation table by said memory address translation circuitry during an address translation requires a further address translation by said memory address translation circuitry to identify a physical address and said further address translation uses a page size variable configured to be set independently of said page size variables for said plurality of virtual machine execution environments.

4. Apparatus as claimed in claim 1, wherein different values of said page size variable specify a physical page size of $2^X$ bytes and a physical page size of $2^Y$ bytes, where X and Y are integers and said translation data includes contiguousness hint data for specifying that $2^{Y-X}$ physical pages of size $2^X$ bytes are contiguously located within a physical address space.

5. Apparatus as claimed in claim 1, wherein said page size variable specifies a value of N to be one of 12 and 16.

6. Apparatus for processing data comprising:
   memory address translation means for performing a top down page table walk operation to translate a virtual memory address to a physical memory address using translation data stored in a hierarchy of translation tables; wherein
   said translation data specifies translations between pages of $2^N$ contiguous bytes of virtual memory addresses and corresponding pages of $2^N$ contiguous bytes of physical memory addresses, where N is a positive integer;
   said hierarchy of translation tables comprises translation tables of $2^N$ contiguous bytes in size such that a complete translation table is stored within one page of said physical memory; and
   said memory address translation means is responsive to a page size variable specifying a current value of N to control said memory address translation circuitry to operate with a selected size of pages of physical memory addresses, pages of virtual memory addresses and translation tables, wherein a predetermined portion of said virtual address extending from a most significant bit end of said virtual address is given a fixed translation to a corresponding portion of said physical address without requiring a page table walk.

7. A method of processing data comprising the steps of:
   performing a top down page table walk operation to translate a virtual memory address to a physical memory address using translation data stored in a hierarchy of translation tables; wherein
   said translation data specifies translations between pages of $2^N$ contiguous bytes of virtual memory addresses and corresponding pages of $2^N$ contiguous bytes of physical memory addresses, where N is a positive integer;
   said hierarchy of translation tables comprises translation tables of $2^N$ contiguous bytes in size such that a complete translation table is stored within one page of said physical memory; and
   operating with a selected size of pages of physical memory addresses, pages of virtual memory addresses and translation tables in response to a page size variable specifying a current value of N, wherein a predetermined portion of said virtual address extending from a most significant bit end of said virtual address is given a fixed translation to a corresponding portion of said physical address without requiring a page table walk.

8. A method as claimed in claim 7, comprising providing a plurality of virtual machine execution environments, said page size variable being independently set for each of said plurality of virtual machine execution environments.

9. A method as claimed in claim 8, wherein each of said virtual machine execution environments has virtual machine translation data stored in a hierarchy of virtual machine translation tables and each access to a virtual machine translation table by said memory address translation circuitry during an address translation requires a further address translation to identify a physical address and said further address translation uses a page size variable set independently of said page size variables for said plurality of virtual machine execution environments.

10. A method as claimed in claim 7, wherein different values of said page size variable specify a physical page size of $2^X$ bytes and a physical page size of $2^Y$ bytes, where X and Y are integers and said translation data includes contiguousness hint data for specifying that $2^{Y-X}$ physical pages of size $2^X$ bytes are contiguously located within a physical address space.

11. A method as claimed in claim 7, wherein said page size variable specifies a value of N to be one of 12 and 16.

* * * * *